United States Patent

[11] 3,609,107

| [72] | Inventors | Nicodemus E. Boyer<br>Parkersburg, W. Va.;<br>Marvin P. Weaver, Belpre, Ohio |
|---|---|---|
| [21] | Appl. No. | 827,160 |
| [22] | Filed | May 23, 1969 |
| [45] | Patented | Sept. 28, 1971 |
| [73] | Assignee | Borg-Warner Corporation<br>Chicago, Ill. |

[54] SELF-EXTINGUISHING POLYURETHANE FOAMS
7 Claims, No Drawings

[52] U.S. Cl. .................................................... 260/2.5 AJ,
260/2.5 AR, 260/77.5 AR
[51] Int. Cl. ........................................................ C08g 51/50,
C08g 22/44, C08g 51/30
[50] Field of Search ............................................ 260/2.5 AJ,
2.5 AR, 77.5 AR

[56] References Cited
UNITED STATES PATENTS

| 2,579,810 | 12/1951 | Fields .......................... | 260/461.1 |
|---|---|---|---|
| 3,385,801 | 5/1968 | Birum et al. ................. | 260/2.5 |
| 3,434,981 | 3/1969 | Baranauckas et al. ........ | 260/2.5 |
| 3,467,622 | 9/1969 | Weil et al. .................... | 260/45.95 |
| 2,416,263 | 2/1947 | MacMullen ................... | 260/613 |

FOREIGN PATENTS

| 1,074,262 | 7/1960 | Germany ....................... | |
| 1,128,086 | 9/1968 | Germany ....................... | |
| 682,706 | 11/1952 | Great Britain ................. | |

OTHER REFERENCES

Chemical Abstracts, Vol. 47, (1953) page 5351.
Jour. Am. Chem. Soc. Vol. 78 (1956) page 5821.
Ibid., Vol. 76 (1954) page 2709.

*Primary Examiner*—Donald E. Czaja
*Assistant Examiner*—H. S. Cockeram
*Attorneys*—Donald W. Banner, William S. McCurry and John W. Butcher

ABSTRACT: A polyurethane foam composition containing dialkyl hydroxyalkanephosphonates incorporated therein. The phosphonate compounds are utilized as integral parts of the polyurethane polymeric chain and are chemically combined therewith to lend fire-retardant characteristics to the polyurethane composition.

SELF-EXTINGUISHING POLYURETHANE FOAMS

BACKGROUND OF INVENTION

Prior to the instant invention, a great variety of polyurethane compositions, including polyurethane foams, both rigid and rubbery foams, were prepared to meet the requirements for polyurethane compositions. It is well known that polyurethane is an excellent polymer which has a variety of end uses. Polyurethanes have good abrasion resistance and excellent low-temperature properties which cause them to be utilized where these characteristics are required. Perhaps the most generally accepted use of foamed polyurethane products has been for low-temperature insulation, packaging, flotation equipment, construction boards and the like.

One of the primary disadvantages of polyurethanes, especially polyurethane foam rubber, has been their noted lack of resistance to fire. Thus, polyurethane has had a tendency to melt and burn when exposed to high heat and/or flame.

Many attempts have been made to provide polyurethane, both rigid and rubbery polyurethane, with fire-retardant characteristics by blending fire-retardant components therewith. Some attempts have met with a limited amount of success. For example, it is known to incorporate fire-retardant additives, such as certain types of phosphorus compounds and antimony oxide, in polyurethane to improve upon the flame-retardant characteristics of the polyurethane rubber composition.

The most successful methods of making polyurethane fire retardant is to incorporate a fire-retardant element into the polymeric chain. One of the fire-retardant polyurethane compositions has been obtained by chemically incorporating phosphonates into the polyurethane composition. Some phosphonates that have been used are set forth in British Pat. No. 1,093,893 assigned to the Hooker Chemical Corporation. The phosphonates set forth in the Hooker patent are primarily polyhydroxy compounds wherein the hydroxy groups are attached to the ester portion of the phosphonate through a carbon to oxygen to phosphorus ester bond. It is known that hydroxyl-containing phosphonates wherein the hydroxy group is attached as a part of the ester moiety frequently have poor aging properties at 100 percent relative humidity. As a result of the poor stability, the phosphorus content is reduced through hydrolysis and aging in humid atmosphere. This reduction in phosphorus content occurs as a result of cleavage between the carbon-oxygen-phosphorous bonds.

Another example of a composition that utilizes a phosphorus compound to add flame resistance to polyurethane are flame-retardant adducts of acrolein polymers and phosphite esters. This involves the addition of phosphites to aldehyde groups. These adducts are set forth in U.S. Pat. No. 3,183,214 assigned to the Union Carbide Corporation. In this patent, dihydrocarbylphosphite is added to polyacrolein and numerous alpha-hydroxyphosphonate units are attached to the polyacrolein chain. The polyhydroxy polymer formed thereby is then used as a polyol in a polyurethane synthesis.

The phosphorus-containing polyurethanes known in the prior art (such as the British Pat. No. 1,093,893 and other references) are characterized by the fact that the phosphorus atom is bound to the cross-linked polyurethane network through phosphorus-oxygen-carbon linkages (P—O—C) which can be relatively easily hydrolyzed in water and very easily hydrolyzed by aqueous acids and bases. They are also characterized by the fact that at least two or, in some cases, at least three hydroxyl groups are considered necessary for bonding the phosphorus-containing monomer to the polymeric urethane molecule. The hydroxyl groups of the phosphorus-containing monomers used in polyurethanes prior to this invention were usually primary or secondary hydroxyl groups.

The differences between the prior art and the present invention will be demonstrated by several equations in which Ur is used to designate the urethane linkage. This group Ur binds the phosphorus-containing moiety to the cross-linked polyurethane network. The urethane linkage Ur arises from the well-known general reaction of a hydroxyl group with an isocyanate group (equation 1).

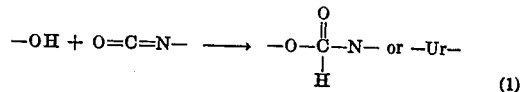

It is obvious and known in the art that hydroxyalkyl phosphites (equation 2), hydroxyalkyl phosphates (equation 3), and bis(hydroxyalkyl) alkanephosphonates (equation 4) react with isocyanates or polyisocyanates to form those urethanes shown below in which the phosphorus atom is bound to the polyurethane network through a P—O—C ester linkage which can be relatively easily hydrolyzed to various acids of phosphorus. In equations 2, 3 and 4 below, R is an alkylene group; R' is an alkyl group; and Ur is the urethane group (defined by equation 1).

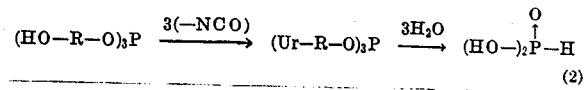

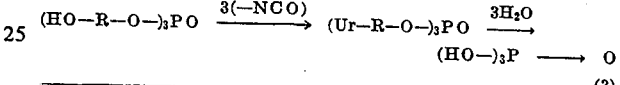

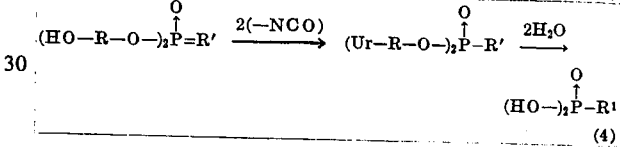

Because of the possibility of hydrolysis, the addition of phosphorus compounds to polyurethane foams was not entirely satisfactory prior to the instant invention. Also, the known polyurethane compositions may lose their fire-retardant properties by leaching. This is due in part to a partial loss of phosphorus content from the polyurethane network by the formation of acids, as shown above (equations 2–4). Another undesirable feature of polyurethane foams that are subject to hydrolysis is their poor dimensional stability, i.e., their tendency to swell and increase their water content, especially in a warm atmosphere containing nearly 100 percent relative humidity. This is revealed by accelerated humid aging tests at various temperatures. Such tests are widely used for characterization of the quality of polyurethane foams, and it has been found that many known phosphorus compounds have a detrimental influence on the dimensional stability of foams, especially if the phosphorus atom is bound to the urethane network through a P—O—C bond (as shown above).

The aforementioned considerations of the unsatisfactory state of the art led to the investigation of novel polyurethane compositions in which the phosphorus atom is bound to the polyurethane network through the hydrolytically and thermally stable P—C bonds, and in which the hydroxyl groups of the phosphonate forming the urethane linkage are tertiary hydroxyl groups.

SUMMARY OF INVENTION

The present invention is directed to fire-retardant polyurethane compositions having esters of hydroxyalkanephosphonates incorporated therein as integral parts of the polymeric chain. Although some of the starting materials, including some esters of hydroxyalkanephosphonates, are known compounds, the resulting polyurethanes are new compositions of matter having excellent properties for a variety of applications such as self-extinguishing hard, foamy insulation materials, elastic foams and as nonfoamed solid polyurethanes, etc. The polyurethanes of this invention differ from the previously known phosphorus-containing polyurethanes in that the phosphorus atom of the instant polyurethanes is bound to the cross-linked three-dimensional polyurethane network through carbon-phosphorus linkages (C—P) which, unlike the prior art compositions, are entirely stable to hydrolysis. Also, the hydroxyalkanephosphonates of this invention have been found to form polyurethane foams with excellent physical properties.

The hydroxyalkanephosphonates (formulas I and II below) used in this invention as raw materials lead to the formation of novel, hydrolytically stable varieties of polyurethane phosphonates, in a manner shown by equations (5) and (6). The scope of the significance of the functional groups $R^1$, $R^2$, $R^3$ and $R^4$ will be defined below; Ur is a urethane linkage to a three-dimensional urethane network, as defined above.

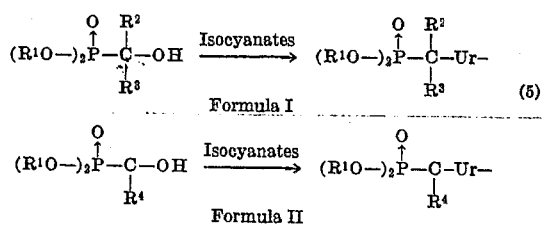

FORMULA II

The products of the reactions are stable to heat and hydrolysis because the phosphorus atom is bound to the polyurethane network through P—C bonds and not through hydrolyzable P—O—C bonds. In addition, the urethane linkages themselves (Ur) are unusually stable to hydrolysis and to chemical reactants such as various solvents because they are formed from tertiary hydroxyl groups. Hydrolysis and other forms of degradation are prevented to a considerable extent by steric hindrance brought about by the placement of the hydroxyl groups. The steric factors due to the functional groups $R^2$, $R^3$ and/or $R^4$ (such as alkyl, alkenyl or alkylene groups) also impede the approach of water molecules or of other reactants to the urethane linkages.

A second advantages of the tertiary hydroxyl groups of these compounds of the general formulas I and II is their rate of reaction which is very suitable for the formation of polyurethane foams. Whereas, primary and, sometimes, secondary hydroxyl groups tend to react with isocyanates faster than the conventional polyols (such as sorbitol, glycerol and polyols made from pentaerythritol and epoxides), the tertiary hydroxyl groups of the compounds I and II react at a rate similar to that of the polyols. Consequently, the foams rise normally, and have desirable physical properties and a fine closed-cell structure. If the reaction is too fast, the distribution of reactions is not proper and the foam tends to crack. Also, there may be chain termination.

The preferred compositions of the present invention are made from phosphorus compounds with only one hydroxyl group (formulas I and II), although other examples of the novel polyurethanes may be made from compounds with an additional hydroxyl group in the $R^2$, $R^3$ or $R^4$ position. In the latter instance, the hydroxyl group is attached to the phosphorus atom only through hydrolytically stable P—C and C—C linkages and not through hydrolyzable C—O—P bonds. The ester groups $R^1O$— in formula I and II do not contain any hydroxyl groups.

The phosphorus compounds of this invention are very effective fire retardants and 3 to 7 percent by weight of compounds of formulas I or II is sufficient to obtain a self-extinguishing or nonburning polyurethane foam as demonstrated by the data in table I. Since only relatively small amounts are needed, there is no significant chain termination although many phosphorus compounds successfully used in this invention contain only one hydroxyl group. A three-dimensional network is formed by the conventional polyol and the polyisocyanate with numerous functional groups such as poly(methylenephenylene isocyanate), although in other compositions a diisocyanate such as 4,4'-diphenylmethane diisocyanate and tolylene 2,4-diisocyanate or a triisocyanate such as 2,4,6-triisocyanato-1-toluene can also be used successfully. The successful use of these compositions is demonstrated by good or excellent dimensional stability of the resulting polyurethane foams to humid aging, as shown by the data in table I below, and by the self-extinguishing character of these foams.

The molecules of the general types I and II enters the crosslinked network of the polyurethane as it is prepared and provide built-in fire retardance to the polymeric compound.

The present invention is specifically directed to polyurethane foams that incorporate a phosphonate compound of the hydroxyalkane type and wherein the polyurethane is used as a foam with fire retardant characteristics. Though the invention is not limited to polyurethane foams, the greatest utility for the composition has been found in the form of both rigid and flexible polyurethane foams. In preparing polyurethane compounds, the normal method entails the preparation of a hydroxyl-containing polymer with a hydroxyl number between about 20 and 1,000 and thereafter reacting the hydroxyl-containing polymer with an organic polymeric isocyanate. The hydroxyl-containing polymer may be either a polyether or a polyester, as is well known in the art, and the present invention encompasses the reaction of either a polyether or a polyester with a polyisocyanate. The invention is the reaction of esters of hydroxyalkanephosphonic acids along with the isocyanate and hydroxyl-containing polymers.

The polyethers that are utilized to prepare the polyurethane may be either linear or branched polyethers having at least one and preferably a plurality of ether linkages containing at least two hydroxyl groups and being substantially free from functional groups other than hydroxyl groups. Polyols, such as poly(ethylene glycols), polymers of propylene oxide, as well as copolymers of propylene oxide and ethylene oxide may also be used.

In order to obtain a rigid foam, a portion of the total polyhydric alcohol component should contain at least three hydroxyl groups. A greater rigidity can be obtained by using a greater number of hydroxyl groups on the polyhydric alcohol such as pentaerythritol or sorbitol. Where a lesser rigidity is desired, a difunctional polyhydroxyl alcohol can be used as part of the polyhydric alcohol component. The preparation of polyester and polyether polyurethane foams is well known in the polymer art and reference may be made to U.S. Pat. Nos. 3,201,358; 3,194,773; and 3,184,419 for various methods of preparing polyurethane foams. The instant invention is not limited to a specific method of preparing polyurethane rubber or polyurethane foam rubber but is instead directed to preparing a polyurethane composition having a high degree of flame-retardant properties.

With respect to the isocyanates utilized in preparing the polyurethanes, both aliphatic and aromatic isocyanates may be used. The aromatic polyisocyanates are preferred primarily because they are less toxic than the aliphatic isocyanates. Examples of aromatic diisocyanates are 2,4-tolylene diisocyanate, 2,6-tolylene diisocyanate and mixtures thereof. Other isocyanates, such as 2,4,6-triisocyanato-1-toluene; 3,3'-demethoxy-4,4'-biphenylene diisocyanate; and poly(methylenephenyleneisocyanate) may also be used.

The isocyanate concentration may be varied so that the NCO/OH ratio is 0.8–1.2. The preferred ratio is 1.0–1.05:1 since at this ratio the most favorable physical properties are attained. The use of an excess of isocyanates tends to yield higher strength but also a more brittle foam. The foaming agents commonly used in the art are suitable and the normally used foaming agents are fluorocarbons or mixtures thereof which boil at approximately 20° C. to 50° C.

The phosphorus compounds that may be incorporated in amounts of from about 3 percent to about 12 percent in polyurethane and polyurethane foams in accordance with this invention are esters of hydroxyalkanephosphonic acids of the formula:

$$(R^1O)_2\overset{O}{\underset{\uparrow}{P}}-\underset{R^3}{\overset{R^2}{\underset{|}{C}}}-OH \quad \text{or} \quad (R^1O)_2\overset{O}{\underset{\uparrow}{P}}-\underset{R^4}{\overset{|}{C}}-OH$$

Formula I           Formula II wherein $R^1$ is selected from the group consisting of alkyl, haloalkyl, aryl, haloaryl, haloalkylaryl and alkylaryl and wherein said groups contain from one to 20 carbon atoms and $R^2$ and $R^3$ are each alkyl, aryl, arylalkyl, hydroxyalkyl, alkylaryl, hydroxyaryl, alkenyl and cycloalkenyl containing from about one to 20 carbon atoms. $R^4$ is an alkylene or substituted alkylene that forms a cycloalkylidene or substituted cycloalkylidene radical with the alpha carbon of formula II.

The R groups may contain up to 20 carbon atoms as indicated; however, when larger groups of carbon atoms are employed, the amount of phosphorus is diluted and the flame-retardant characteristics are reduced unless the carbon atoms carry attached halogen atoms as shown in some of the examples below.

The manner of preparation of the compounds of formulas I and II may follow the addition reaction of secondary phosphites of the formula:

$$(R^1O)_2\overset{O}{\underset{\uparrow}{P}}H$$

Formula III with monoketones and diketones.

Examples of monoketones include acetone, methyl ethyl ketone, methyl-n-propyl ketone, diethyl ketone, di-n-propyl ketone, hexanone-2, hexanone-3, methyl isobutyl ketone, diisobutyl ketone, methylbutyl ketone, diisopropyl ketone, stearone, cyclopentanone, cyclohexanone and benzophenone.

Examples of diketones to which a secondary phosphite may be added are compounds such as 2,4-pentanedione, diacetylbenzene, diacetyltoluene, diacetylthiophene, diacetylanisole, diacetyl, diacetylnaphthalene, diacetylpyridine, diacetylquinoline, diacetylfuran, diacetylferrocene, acetylacetone, 5,5-dimethyl-1,3-cyclohexanedione, and indane-1,3-dione.

Hydroxyketones may also be employed. Examples are diacetone alcohol, acetoin, benzoin, dimedone, benzacetoin, 2-hydroxyethyl methyl ketone, 1-hydroxyethyl methyl ketone, and bis(2-hydroxyethyl) ketone. Examples of unsaturated ketones that may be used include: methyl vinyl ketone, divinyl ketone, mesityl oxide, phorone, isophorone, 1-acetylcyclohexene, and 2-methylcyclohexenone. Mixtures of ketones (e.g., the hydroxyketones and the unsaturated ketones formed in the condensation of acetone alone or with formaldehyde) may be employed.

The phosphorus compounds employed in preparing polyurethane compounds may range in amounts of from about 3 percent to about 10 percent by weight of the total polyurethane composition. The preferred amounts are from about 3 percent to about 7 percent by weight. The larger amounts are not economical and in addition may affect the physical properties of the base material to which they are added. This is especially true if the phosphorus compound is monofunctional.

It will be noted that reactive halogenated compounds such as 1,4,5,6,7,7-hexachloro-5-norbornen-2-ol; 1, 4, 5, 6, 7, 7-hexachloro-2-hydroxymethyl-5-norbornene; and 1, 4, 5, 6, 7, 7-hexachloro-5-norbornen-2-yl methyl carbinol may also be used in combinations with the phosphorus compounds of this invention. Nonreactive halogenated compounds such as 6-(1',2',3',4',7',7'-hexachloro-2'-norbornen-5'-yl)-1,2,3,4,9,9-hexachloro-1,4,4a, 5,6,7,8,8a-octahydro-1,4-methanonaphthalene as well as 1,4,5,6,7,7-hexachloro-2-phenyl-5-norbornene may also be used. Other halogenated hydroxy compounds that may be used in minor amounts with the hydroxy compounds of this invention in forming polyurethane compound include polyhaloaliphatic, such as 1,1,1-trichloro-2-methyl-2-propanol polyhaloalicyclic, and polyhaloaromatic compounds. These halogenated compounds will preferably include one hydroxy group in the structure (e.g., pentachlorophenol).

To more effectively illustrate the invention examples are provided for preparation of polyurethane foams using various phosphorus compounds as reactants in the preparation of polyurethane. Unless otherwise indicated, all parts are by weight in the examples.

EXAMPLE NO. 1

142.77 parts of a polymeric polyisocyanate (Kaiser Chemical WUC3019-T) a crude methylene-bis-(4-phenylisocyanate); the isocyanate functional group content is 30.5–32.0 percent, it has a functionality of 2.7 and a structural formula as follows:

$$OCN-\underset{}{\bigcirc}-CH_2-\underset{}{\bigcirc}-NCO$$

containing 1.62 parts of a silicone surfactant (Union Carbide L-5320) was added to a mixture comprised of 30.21 parts of 1-dimethoxyphosphonocyclohexanol [(DPC), *$C_8H_{17}O_4P$, white crystals, m.p. 118°–120° C. Aframor Chemical Abstracts 47,535 (1953)], 86.25 parts of a polyol [Wyandotte Pluracol PEP 450, a poly(oxypropylene) derivative of pentaerythritol with a functionality of 4. The compound has a hydroxyl number of 560 and molecular weight of 400. The hydroxyl equivalent is 100. The major component is $$C-(CH_2OCH-CH_2-OH)_4$$
$$\underset{CH_3}{|}$$

], 37.53 parts of $CCl_3F$ and 1.62 parts of a tetramethylguanidine in a blender. The resulting mixture was stirred for 10 seconds and poured into a polyethylene box. The resulting foam contained 1.56 percent phosphorus and was a hard, tough and nonburning polyurethane foam (ASTM-D-1692 –59T test).

EXAMPLE NO. 2

The procedure of example No. 1 was repeated except that no phosphorus compound was added. The resulting foam had a burning rate of 5.76 inches/min. (ASTM-D-1692-59T test). This is a control for example No. 1 from which the role of the phosphorus compound in example No. 1 becomes evident.

EXAMPLE NO. 3

The procedure was the same as that of example No. 1 except that DPC in combination with a chlorinated compound was employed. The composition of the foam is shown below:
- 10.08 parts DPC (1-dimethoxyphosphono-1-cyclohexanol or $C_8H_{17}O_4P$)
- 143.49 parts polymeric isocyanate (WUC 3019-T-Kaiser Chemical)
- 1.62 parts tetramethylguanidine
- 1.62 parts silicone surfactant (Union Carbide L-5320)

*This compound was prepared from cyclohexanone and dimethyl phosphite by a method known in the prior art.

- 96.45 parts polyol (Wyandotte Pluracol PEP 450)
- 37.43 parts $CCl_3F$
- 9.21 parts 6-(1',2',3',4',7',7'-hexachloro-2norbornen-5'-yl)-1,2,3,4,9,9-hexachloro-1,4,4a,5,6,7,8,8a-octahydro-1,4-methanonaphthalene ($C_{18}H_{12}Cl_{12}$, white crystals, m.p. 243° C.).

The resulting foam was hard, tough, and contained 0.5 percent phosphorus and 2 percent chlorine. It was self-extinguishing (ASTM-D-1692-59T).

Using the procedure of example No. 1, examples 4 through 9 illustrate how a variety of recipes were used to produce a polyurethane foam.

EXAMPLE NO. 4

Foam composition:
145.26 parts polymeric polyisocyanate (4,4'-diphenylmethane diisocyanateaKaiser Chemical WUC3019-T)
1.62 parts dibutyl tin dilaurate
1.62 parts silicone surfactant (Union Carbide L-5320)
37.53 parts $CCl_3F$
10.08 parts DPC (As in examples 1 and 3)
94.95 parts polyol (Wyandotte Pluracol PEP 450)
8.94 parts 1,4,5,6,7,7-hexachloro-5-norbornen-2-ol ($C_7H_4OCl_6$, (white crystals, M.P.) 155° C.)

The resulting foam contained 0.5 percent phosphorus and 2 percent chlorine. It was self-extinguishing (the test used was ASTM-D-1629-59T).

EXAMPLE NO. 5

Foam composition:
145.92 parts polymeric polyisocyanate (Kaiser Chemical WUC3019-T)
10.08 parts DPC
1.62 parts tetramethylguanidine
1.62 parts silicone surfactant (Union Carbide L-5320)
37.53 parts $CCl_3F$
93.90 parts polyol (Wyandotte Pluracol (PEP 450)
9.33 parts 2-hydroxymethyl-1,4,5,6,7,7-hexachloro-5-norbornene ($C_8H_6Cl_6O$, white crystals, m.p. 165° C.)

The resulting foam was hard, tough, and contained 0.5 percent phosphorus and 2 percent chlorine. It was self-extinguishing (ASTM 1692-D-59T)

EXAMPLE NO. 6

Foam Composition.
145.20 parts polymeric isocyanate (Kaiser Chemical WUC3019-T)
1.62 parts tetramethylguanidine
1.62 parts silicone surfactant (Union Carbide L-5320)
37.53 parts $CCl_3F$
10.08 parts DPC
93.00 parts polyol (Wyandotte Pluracol PEP 450)
10.95 parts 1-pentachlorophenoxy-2-propanol ($C_9H_7Cl_5O_2$, b.p. 155°-162°C /0.65-1.2 mm., pale yellow, viscous liquid which crystallized to a white solid, m.p. 57-63° C.)

The resulting foam contained 0.5 percent P and 2 percent Cl. It was self-extinguishing ASTM-D-1692-59T).

EXAMPLE NO. 7

Foam composition:
30.92 parts of 2-diethoxyphosphono-2-butanol* ($C_8H_{19}O_4P$, clear, water-white liquid, b.p. 131°-132°C./8.5-9.5 mm.)

*This compound was prepared from diethyl phosphite and methyl ethyl ketone by method known in prior art.

85.80 parts polyol (Wyandotte Pluracol PEP 450)
1.62 parts tetramethylguanidine
1.62 parts silicone surfactant (Union Carbide L-5320)
37.53 parts $CCl_3F$
142.53 parts polymeric polyisocyanate (Kaiser Chemical WUC3019-T)

The resulting foam was nonburning (ASTM-D-1692-59T) and had physical properties similar to those for the foam from example No. 3.

EXAMPLE 8

Foam Composition:
28.92 parts of 2-diethoxyphosphono-2-propanol** ($C_7H_{17}O_4P$, b.p. 130°-131° C./9-10 mm., clear, water-white liquid)
86.70 parts polyol (Wyandotte Pluracol PEP 450)
1.62 parts tetramethylguanidine
1.62 parts silicone surfactant (Union Carbide L-5320)
37.53 parts $CCl_3F$
143.61 parts polymeric polyisocyanate (Kaiser Chemical WUC3019-T)

The resulting foam was nonburning and the physical properties were similar to those of the foam from example No 8.

EXAMPLES NO. 9-22

The following fire-retardant compounds were synthesized for similar applications and incorporated in rigid and flexible polyurethane foams by a procedure analogous to that described in example No. 1 for the fire-retardant compound DPC. The compounds listed below were identified by elementary analyses, molecular weight determinations and infrared spectra.

**This compound was prepared from acetone and diethyl phosphite by a method known in the prior art.

FIRE RETARDANT COMPOUNDS USED IN THE SPECIFIC EXAMPLES

| Example Number | Structural formula | Name and empirical formula | Appearance and properties | How synthesized |
|---|---|---|---|---|
| 10... | (structure with HO, P→O, OCH₃, OCH₃ on indanone) | 3-hydroxy-3-dimethoxy-phosphono-1-indanone, $C_{11}H_{13}O_5P$. | Tan brown powder, dec. above 295° C. | From 14.6 g. of 1,3-indandione, 14 g. of dimethyl phosphite, and sodium methoxide from 1.4 g. of sodium in methanol solution heated for 4 hr. at up to 67° C. |
| 11... | $(CH_3O)_2-P$ ... $P(-OCH_3)_2$, OH, OH, CH₃ CH₃ cyclohexane | 1,3-dihydroxy-1,3-bis(dimethoxy-phosphono-)5,5-dimethyl-cyclohexane, $C_{12}H_{26}O_8P_2$. | Pale orange viscous liquid, density 1.282 and index of refraction 1.5100 at 25° C. | From 140.2 g. of dimedone, 231.2 g. of dimethyl phosphite, and sodium methoxide (catalyst) from 1 g. of sodium in 50 g. of methanol with heating for 7 hr. at up to 149° C. |
| 12... | (chlorinated bicyclic structure with HO P→O (—OCH₃)₂) | $C_{12}H_7O_5Cl_5P$ | White crystals, m.p. 209-211° C. | From 11.4 g 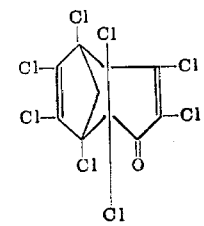 |

| Example Number | Structural formula | Name and empirical formula | Appearance and properties | How synthesized |
|---|---|---|---|---|
| | | | | 55.0 g. of dimethyl phosphite; and 0.54 g. of sodium methoxide (catalyst), with heating and distilling off excess phosphite for 4 hr. at up to 110° C. |
| 13 | $CH_2=CH-\underset{O \leftarrow P(-OCH_3)_2}{\overset{O=}{\underset{|}{C}}}-CH_3$ ... OH | 3-dimethoxy-phosphono-1-buten-3-ol, $C_6H_{13}PO_4$. | Clear, colorless liquid, b.p. 84° 0.03 mm. to C./ 92° C./0.17 mm. | From 60.4 g. of methyl vinyl ketone, 120.1 g. of dimethyl phosphite, and 1.15 g. of sodium methoxide in 60 ml. of methanol, at up to 70° C. for 2 hr., followed by 2 fractional distillations; the yield of this pure fraction was 41.8 g. |
| 14 | $(CH_3O-)_2\overset{O}{\overset{\uparrow}{P}}-CH_2CH_2-\underset{(CH_3O-)_2 P\rightarrow O}{\overset{OH}{\underset{|}{C}}}-CH_3$ | 1,3-bis(dimethoxy-phosphono 3-butanol, $C_9H_{20}P_2O_7$. | Clear, pale yellow liquid, b.p. 135–140° C./0.06 mm. | The same reaction as for the compound of above Example 13, except that the compound of this Example 14 was the highest-boiling fraction purified by 2 fractional distillations; when pure, the yield was 8.6 g. For practical applications in foams the separation of the compounds of Examples 13 and 14 is not required; in that case the crude yield is nearly quantative. |
| 15 | $CH_3-\underset{O\leftarrow P(-OCH_3)_2}{\overset{OH}{\underset{|}{C}}}-\overset{OH}{\underset{|}{CH}}-CH_3$ | Dimethyl 2,3-dihydroxy-2-butylphos-phonate, $C_6H_{15}PO_5$. | Clear, colorless liquid, b.p. 96° C./0.39 mm. to 124° C./0.6 mm. | From 176.3 g. of acetoin; 264.1 g. of dimethyl phosphite; sodium methoxide (catalyst) prepared from 2.3 g. Na in $CH_3OH$; and 400 ml. of toluene (solvent); heated for 2 hr. at 75° C. and purified by fractional distillation. |
| 16 | $\overset{HO}{\underset{|}{CH_2}}-CH_2-\underset{(CH_3O-)_2P\rightarrow O}{\overset{OH}{\underset{|}{C}}}-CH_3$ | 3-dimethoxy-phosphono-1,3-butanediol, $C_6H_{15}O_5P$. | Clear, colorless liquid bp 120° C./0.45 mm. to 129° C./0.6 mm. | From 176.3 g. of methyl 2-hydroxy ethyl ketone; 264.1 g. of dimethl phosphite; & 1.5 g. of sodium methoxide in 50 ml. of methanol; heated for 4 hr. to 67° C. and purified by fractional disitillation. |
| 17 | $(ClCH_2CH_2O-)_2P\overset{O}{\nearrow}$ cyclohexyl with OH | 1-bis-(2-chloro-ethoxy-) phos-phono-1-cyclo-hexanol, $C_{10}H_{19}Cl_2O_4P$. | White crystals, m.p. 74–76° C. | From 103.5 g. of bis(2-chloroethyl) phosphite 49 g. of cyclohexanone; and 10 g. of a saturated solution of sodium methoxide in methanol with heating for 2¾ hr. at 24–57° C., followed by filtration. |
| 18 | $(CH_3O-)_2P\overset{O}{\nearrow}$ cyclohexyl with OH and Cl | 1-dimethoxy-phosphono-2-chloro-1-cyclo-hexanol, $C_8H_{16}ClO_4P$. | White crystals, m.p. 117–120° C. | From 55 g. of dimethyl phosphite; 65.7 g. of 2-chlorocyclohexanone; and 0.7 g. of sodium methoxide with heating for 8.5 hr. at 23–58° C., followed by distilling off unreacted dimethyl phosphite and 2-chlorocyclohexanone. |
| 19 | $(CH_3O-)_2\overset{O}{\overset{\uparrow}{P}}$ cyclopentyl with OH | 1-dimethoxyphos-phono-1-cyclo-pentanol, $C_7H_{15}O_4P$. | White crystals, m.p. 77–79° C. | From 84 g. of cyclopentanone; 110 g. of dimethyl phosphite; and 0.28 g. of sodium, with heating for 1 hr. at 60° C. followed by filtration. |
| 20 | $CH_3-\underset{(CH_3O-)_2P\rightarrow O}{\overset{OH}{\underset{|}{C}}}-C_6H_4-\underset{O\leftarrow P(-OCH_3)_2}{\overset{OH}{\underset{|}{C}}}-CH_3$ | $C_{14}H_{24}O_8P_2$ | White crystals, m.p. 187–193° C. | From 25 g. of p-diacetylbenzene; 34.1 g. of dimethyl phosphite; and 0.28 g. of sodium, with heating for 2 hr. 40 min. at 35–52.5° C.; followed by filtration. |
| 21 | thienyl-$\underset{(CH_3O-)_2P\rightarrow O}{\overset{OH}{\underset{|}{C}}}-CH_3$ | $C_8H_{13}O_4SP$ | White crystals, m.p. 101–103° C. | From 50 g. of methyl 2-thienyl ketone; 43.7 g. of dimethyl phosphite; and 0.7 g. of sodium methoxide, with heating for 9 hr. at 22–70° C. followed by distillation of unreacted methyl 2-thienyl ketone and dimethyl phosphite. |
| 22 | $\left[Cl_3C-\underset{CH_3}{\overset{CH_3}{\underset{|}{\overset{|}{C}}}}-O-\right]_2P\rightarrow O$ attached to cyclohexyl-OH | 1-bis-(β,β,β-tri-chloro-t-butoxy-)phos-phono-1-cyclo-hexanol, $C_{14}H_{23}Cl_6O_4P$. | White crystals, m.p. 204–206° C. | From 4.9 g. of cyclohexanone; 19.25 g. of bis-(β,β,β-trichloro-t-butyl)phosphite; and 2 ml. of 5% sodium methoxide solution in methanol with heating for ½ hr. at 45–50° C., followed by filtration. |
| 23 | $[CH_3(CH_2)_{19}O-]_2\overset{O}{\overset{\uparrow}{P}}-\underset{CH_3}{\overset{CH_3}{\underset{|}{\overset{|}{C}}}}-OH$ | Bis-(eicosanyl) 2-hydroxy-2-propanephos-phonate, $C_{43}H_{89}O_4P$. | White, waxy solid, useful as an additive of polymers with plasticizing and mold releasing properties. | From 90 g. of 1-eicosanol and 13.8 g. of phosphorus trichloride in 100 ml. of toluene, followed by the reaction of the resulting bis-(eicosanyl)phosphite with 6 g. of acetone and 0.1 g. of sodium, and fractional crystallization from ether. |

TABLE I.—FIRE RETARDANT AND PHYSICAL PROPERTIES OF RIGID POLYURETHANE FOAMS CONTAINING DPC* ALONE AND IN COMBINATION WITH CHLORINATED COMPOUNDS

| Ex. No. | Additive, wt. g. | FR[4] | Foam composition Percent | | | Foam composition Grams | | | Dimensional stability[6] 100C, dry | | 70C, 100% rh[8] | | Compressive strength[7] 100C, dry | | 100% rh | |
|---|---|---|---|---|---|---|---|---|---|---|---|---|---|---|---|---|
| | | | P | Cl | Additive | Polyol | Polyisocyanate | 1 d. | 14 d.[9] | 1 d. | 14 d. | 1 d. | 14 d. | 1 d. | 14 d. |
| 23 | DPC,* 10.08 | SE | 0.5 | | 3.4 | 100.2 | 148.95 | 3.40 | 7.40 | 1.37 | 1.21 | 20.2 | 23.1 | 20.0 | 22.8 |
| 24 | DPC, 15.09 | SE | 0.75 | | 5.0 | 96.75 | 147.39 | 2.52 | 4.29 | 1.57 | 2.10 | 21.8 | 23.3 | 19.6 | 24.6 |
| 25 | DPC, 20.10 | SE | 1.0 | | 6.8 | 93.30 | 145.83 | 2.02 | 6.23 | 1.56 | 1.58 | 19.3 | 19.7 | 18.4 | 22.0 |
| 26 | DPC, 30.24 | NB | 1.5 | | 10.0 | 86.40 | 142.71 | 2.02 | 2.63 | 8.8 | 2.30 | 17.8 | 17.1 | 19.3 | 21.2 |
| 27 | DPC, 60.42 | SE | 3.0 | | 20.0 | 64.80 | 133.95 | 1.74 | 5.47 | 1.49 | 2.72 | 21.6 | 25.3 | 18.8 | 22.5 |
| 28 | {Triethyl phosphite,[10] 24.12, DPC, 0.0} | NB | 1.5 | | 8.04 | 97.20 | 137.91 | 30.58 | 14.17 | 20.12 | 5.44 | 8.4 | 11.0 | 11.3 | 15.1 |
| 29 | {CNB,[1] 9.21, DPC, 10.08} | SE | 2.0 / 0.5 | | 3.0 / 3.4 | 96.45 | 143.40 | 1.61 | 6.77 | 1.11 | 1.42 | 22.3 | 24.1 | 22.5 | 26.4 |
| 30 | {CNB, 32.25, DPC, 10.08} | SE | 7.0 / 0.5 | | 10.7 / 3.4 | 86.85 | 130.05 | 0.58 | 3.39 | 1.00 | 0.34 | 21.9 | 21.2 | 22.6 | 23.7 |
| 31 | {HN,[2] 8.94, DPC, 10.08} | SE | 2.0 / 0.5 | | 3.0 / 3.4 | 94.95 | 145.26 | 2.72 | 5.25 | 0.83 | 2.58 | 23.5 | 23.4 | 23.0 | 20.3 |
| 32 | {HMN,[3] 32.70, DPC, 10.08} | SE | 2.0 / 0.5 | | 3.0 / 3.4 | 80.10 | 136.35 | 2.03 | 3.77 | 1.69 | 2.01 | 21.7 | 20.0 | 24.4 | 27.5 |
| 33 | {PCP,[5] 10.95, DPC, 10.08} | SE | 2.0 / 0.5 | | 3.7 / 3.4 | 93.00 | 145.20 | 0.88 | 1.15 | 0.83 | 0.91 | 18.9 | 20.7 | 22.4 | 23.4 |
| 34 | Control (no additive) | B | | | | 107.30 | 152.10 | 2.90 | 6.52 | 0.86 | 1.82 | 20.99 | 21.73 | 18.14 | 21.29 |

*DPC=1-dimethoxyphosphonocyclohexanol.
[1] CNB=6-(1',2',3',4',7',7'-hexachloro-2'-norbornen-5'-yl)-1,2,3,4,9,9-hexachloro-1,4,4a,5,6,7,8,8a-octahydro-1,4-methanonapthalene.
[2] HN=1,4,5,6,7,7-hexachloro-5-norbornen-2-ol.
[3] HMN=2-hydroxymethyl-1,4,5,6,7,7-hexachloro-5-norbornene.
[4] FR=Fire Retardance: SE, self-extinguishing; B, burned; NB, non-burning.
[5] PCP=1-pentachlorophenoxy-2-propanol.
[6] Dimensional stability determined by ASTM D2126-62T.
[7] Compressive strength determined by ASTM D1621-59T.
[8] rh=relative humidity.
[9] d.=days.
[10] Triethyl phosphite was used as a control to show that the foam is SE but physical properties are poor.

wherein $R^1$ is selected from the group consisting of alkyl and haloalkyl; $R^2$ is selected from the group consisting of alkenyl, dialkoxyphosphonoalkyl, hydroxyalkyl, dialkoxyphosphonohydroxyalkylaryl, and thienyl; $R^3$ is an alkyl group and $R^4$ is selected from the group consisting of alkylene, substituted alkylene and substituted alkenylene.

It will be understood that while the invention has been described in connection with certain specific embodiments of flame-retardant polyurethane and polyurethane foam, that this is by way of illustration and not for the purpose of limiting the invention. The scope of the invention is defined solely by the appended claims which should be construed as broadly as is consistent with the prior art.

1. A fire-retardant polyurethane composition produced by reacting (A) a hydroxyl-containing polymer selected from the group consisting of polyethers and polyesters and (B) an organic polyisocyanate, in the presence of a fire-retardant compound consisting of from 3 percent by weight to 12 percent by weight of at least one hydroxyl-containing phosphonate selected from the group consisting of

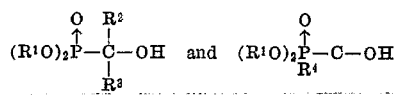

2. The fire-retardant polyurethane composition of claim 1 wherein the fire-retardant compound is 1-dimethoxyphosphono-1-cyclohexanol and wherein the reaction is conducted in the presence of a blowing agent.

3. The polyurethane composition of claim 1 wherein fire retardance is improved by adding a halogen-substituted hydrocarbon compound to the reactants and wherein the reaction is conducted in the presence of a blowing agent.

4. The polyurethane foam composition of claim 3 wherein the halogenated compound is 6-(1',2',3',4',7',7'-hexachloro-2'-norbornen-5'-yl)-1,2,3,4,9,9-hexachloro-1,4,4a,5,6,7,8,8a-octahydro-1,4-methanonaphthalene.

5. The polyurethane foam composition of claim 3 wherein fire retardance is improved by adding to the reactants a halogenated monohydroxy compound selected from the group consisting of halogenated aliphatic or halogenated cycloaliphatic monohydroxy compounds and halogenated aromatic monohydroxy compounds.

6. The polyurethane of claim 5 wherein the halogenated monohydroxy compound is 1,1,1-trichloro-2-methyl-2-propanol.

7. The polyurethane foam composition of claim 5 wherein the monohydroxy compound is pentachlorophenol.

UNITED STATES PATENT OFFICE
CERTIFICATE OF CORRECTION

Patent No. 3,609,107　　　　　　　　Dated September 28, 1971

Inventor(s) Nicodemus E. Boyer et al

It is certified that error appears in the above-identified patent and that said Letters Patent are hereby corrected as shown below:

Claim 1, after the formula insert:

-- wherein $R^1$ is selected from the group consisting of alkyl and haloalkyl; $R^2$ is selected from the group consisting of alkenyl, dialkoxyphosphonoalkyl, hydroxyalkyl, dialkoxyphosphonohydroxyalkylaryl, and thienyl; $R^3$ is an alkyl group --

Signed and sealed this 12th day of December 1972.

(SEAL)
Attest:

EDWARD M. FLETCHER, JR.　　　　　　　ROBERT GOTTSCHALK
Attesting Officer　　　　　　　　　　Commissioner of Patents

UNITED STATES PATENT OFFICE
CERTIFICATE OF CORRECTION

Patent No. 3,609,107   Dated September 28, 1971

Inventor(s) NICODEMUS E. BOYER, ET. AL.

It is certified that error appears in the above-identified patent and that said Letters Patent are hereby corrected as shown below:

Column 1, line 45, "phosphorous" should read -- phosphorus --; line 54, "dihydrocarbylphosphite" should read -- dihydrocarbyl phosphite -- . Column 2, lines 5-8, in the formula, " $-O-C-N$ " should read -- $-O-\underset{H}{\overset{}{C}}-N$ -- ; line 29, in the formula, "P=R", should read -- $\underset{H}{P-R}$ -- . Column 3, line 23, " $\underset{R^4}{C}$ ", both occurrences, should read -- $\underset{R^4}{\overset{()}{C}}$ -- . Column 4, line 63, "demethoxy" should read -- dimethoxy -- . Column 5, line 5, in the formula, "$\underset{R^4}{C}$" should read -- $\underset{R^4}{\overset{()}{C}}$ -- . Column 6, line 27, "Aframor" should read -- Abramov -- ; line 28, "47,535" should read -- 47, 5351 -- ; lines 63-64, the footnote should be inserted after line 75 in this column. Column 7, line 6, "diisocyanateKaiser" should read -- diisocyanate-Kaiser -- ; line 14, remove the "( )" from "white crystals". Column 8, line 44, after "and", the word should be -- diethyl -- . Columns 7 and 8, formula "12" should read as follows:

| 12 | 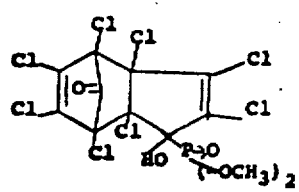 | $C_{12}H_7O_5Cl_8P$ | White crystals, m.p. 209-211°C | From 11.4g 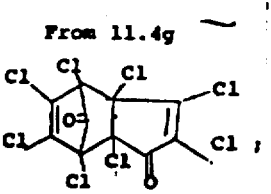 55.0g of dimethyl phosphite; & 0.54g of sodium methoxide (catalyst), with heating & distilling off excess phosphite for 4 hr at up to 110°C, |

Patent Number 3,609,107

Columns 9-10, remove "O=", both occurrences, before formula "13". Column 9, in the formula "22", cancel the "X". Column 11, the formula in claim 1 should read as follows:

Signed and sealed this 9th day of July 1974.

SEAL)
ttest:

cCOY M. GIBSON, JR.
ttesting Officer

C. MARSHALL DANN
Commissioner of Patents